T. BEHAN.
PIPE COUPLING.
APPLICATION FILED JAN. 4, 1917.
1,236,816.
Patented Aug. 14, 1917.
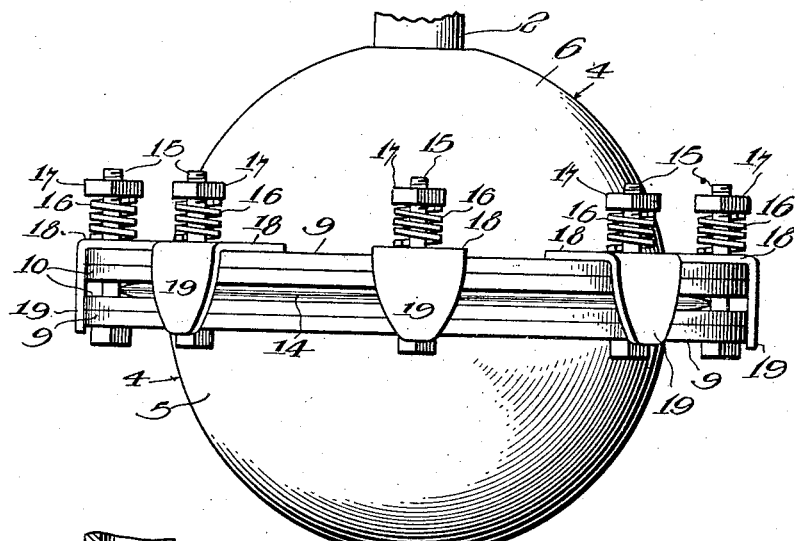
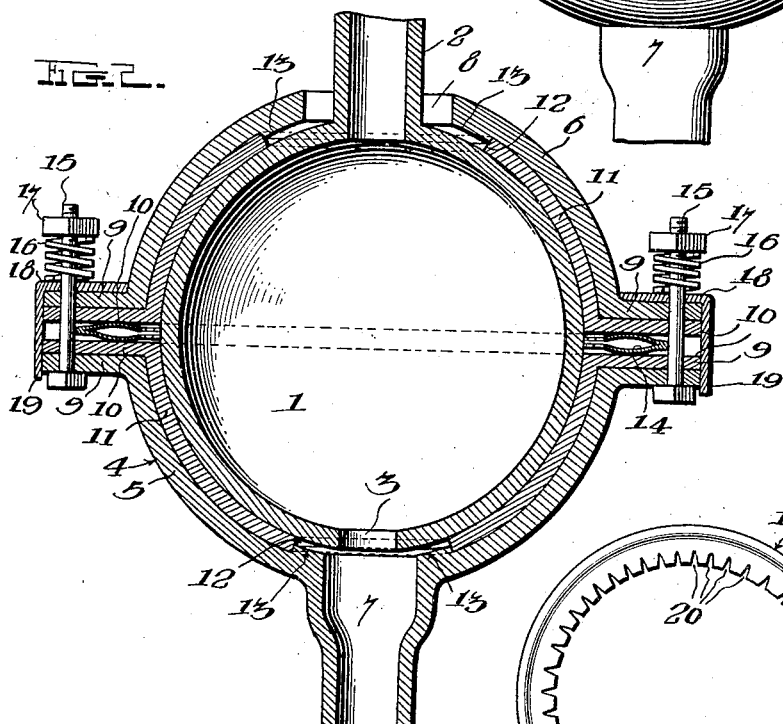
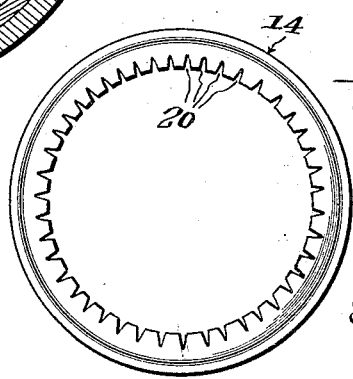
Witness
H. Woodard
Inventor
Thomas Behan
By H. R. Wilson & Co.
Attorneys

UNITED STATES PATENT OFFICE.

THOMAS BEHAN, OF ALIQUIPPA, PENNSYLVANIA.

PIPE-COUPLING.

1,236,816.  Specification of Letters Patent.  Patented Aug. 14, 1917.

Application filed January 4, 1917. Serial No. 140,609.

*To all whom it may concern:*

Be it known that I, THOMAS BEHAN, a citizen of the United States, residing at Aliquippa, in the county of Beaver and State of Pennsylvania, have invented certain new and useful Improvements in Pipe-Couplings; and I do declare the following to be a full, clear, and exact description of the invention, such as will enable others skilled in the art to which it appertains to make and use the same.

My invention relates more particularly to pipe couplings of the type employed in the steam and air lines of railway cars for permitting the substitution of metal piping for the usual flexible hoses now employed for connecting the lines of the several cars.

The object of the invention is to provide an improved type of ball joint so constructed as to be leak-proof and to automatically take up wear, yet one which will be simple and inexpensive regardless of its efficiency.

With the foregoing general object in view the invention resides in certain novel features of construction and in unique combinations of parts to be hereinafter fully described and claimed, the descriptive matter being supplemented by the accompanying drawing which constitutes a part of this application and in which:

Figure 1 is a side elevation of the improved valve;

Fig. 2 is a sectional view thereof; and,

Fig. 3 is a top plan view of the gasket.

In the drawing above briefly described the numeral 1 has reference to a hollow ball carried by one end of a pipe connection 2 and having a port 3. 4 designates a socket in which the ball 1 is received for universal movement, said socket consisting of a pair of hollow hemispherical sections 5 and 6, the former having at its inner end a suitable pipe connection 7 for registration with the port 3 while the section 6 is formed with an opening 8 through which the connection 2 passes loosely to permit the necessary relative movement.

The inner edges of the two sections 5 and 6 are spaced apart and provided with annular outwardly extending flanges 9 which are also in spaced relation, being in contact with other outstanding annular flanges 10 on the edges of a pair of packing cups 11 located in the two sections 5 and 6 for fluid-tight contact with the ball 1, said cups being by preference formed of fiber although any other suitable material may be employed. The inner portions of the cups 11 have openings 12 formed therein of greater size than the pipe connections 2 and 7, the walls of said openings being in contact with annular shoulders 13 formed on the inner faces of the two sections 5 and 6, said shoulders being of less thickness than the cups 11 in order that the latter only will contact with the ball 1 until excessively worn, whereupon the shoulders in question will abut said ball. When this occurs, however, new cups 11 are substituted for the old.

A spring metal gasket 14 is interposed between the flanges 10 as shown clearly in Fig. 2, and bolts 15 pass through these flanges and through those designated at 9 for securing the two sections of the socket 14 together, coiled springs 16 being interposed between the nuts 17 of said bolts and the washer plates 18 which contact with one of the flanges 9. The metal of which the springs 16 is constructed will by preference be rectangular in transverse section so that the ends of said springs may prevent accidental rotation of the nuts 17 and in order that the washer plates 18 may not turn so as to permit rotation of the springs which might otherwise permit the nuts to loosen, said plates are bent downwardly at their outer ends to form fingers 19 contacting with the outer edges of the several flanges 9 and 10.

The gasket 14 is formed of a metal ring folded at the outer edge of the gasket and having its inner edges disposed at the inner edge thereof, said gasket being of substantially oval-shape in transverse section in order that its two halves may yield together as the tension of the springs 16 take up the wear of the packing cups 11, thus insuring that a tight connection be maintained. As the gasket is compressed its inner edge must necessarily travel inwardly a slight amount and in order to readily permit this, such edge is preferably formed with a multiplicity of circumferentially spaced notches 20.

By constructing the pipe joint in the manner shown and described it will not only be simple and inexpensive but efficient and durable. As the packing cups 11 wear, the springs 16 force the two sections 5 and 6 toward each other to take up such wear, the tension of the spring gasket 14 being less than that of said springs to readily permit this operation.

On account of the advantages of the construction shown and described, it constitutes the preferred form of the improved joint, but it is to be understood that within the scope of the invention as claimed, numerous changes may be made without sacrificing the principal advantages.

I claim:

1. A pipe coupling comprising a ball carried by one pipe, a spherical socket carried by the other pipe and receiving said ball therein, said socket being formed of two hemispherical sections having their inner edges spaced and provided with outwardly projecting annular flanges also spaced apart, packing cups in said sections having outstanding flanges on their edges spaced apart and contacting with the inner faces of the aforesaid flanges, a spring metal gasket interposed between said last named flanges, bolts connecting the first named flanges, and springs on said bolts for moving the two sections of the socket toward each other as the packing cups wear, said spring metal washer being compressible to permit this movement.

2. A pipe coupling comprising a ball carried by one pipe, a spherical socket carried by the other pipe and receiving said ball therein, said socket being formed of two hemispherical sections having their inner edges spaced and provided with outwardly projecting annular flanges also spaced apart, packing cups in said sections having outstanding flanges on their edges spaced apart and contacting with the inner faces of the aforesaid flanges, a spring metal gasket interposed between said last named flanges and formed of a metal ring folded at the outer edge of the gasket and having its edges disposed at the inner edge of the gasket and formed with circumferentially spaced notches, said gasket being substantially oval in transverse section, bolts connecting the first named flanges, and springs on said bolts for moving the two sections of the socket toward each other as the packing cups wear, said spring metal gasket being compressible to permit this movement.

In testimony whereof I have hereunto set my hand in the presence of two subscribing witnesses.

THOMAS BEHAN.

Witnesses:
ROBERT DOUGLAS BARRY.
STEVAN HOWATIC.

Copies of this patent may be obtained for five cents each, by addressing the "Commissioner of Patents. Washington, D. C."